United States Patent [19]

Hesse

[11] 4,227,749
[45] Oct. 14, 1980

[54] TRACK TENSIONING APPARATUS AND METHOD FOR TRACK-TYPE VEHICLES

[75] Inventor: Hans G. Hesse, Munich, Fed. Rep. of Germany

[73] Assignee: CON-TECHNIK GmbH, Fed. Rep. of Germany

[21] Appl. No.: 906,448

[22] Filed: May 17, 1978

[30] Foreign Application Priority Data

May 18, 1977 [DE] Fed. Rep. of Germany ....... 2722457

[51] Int. Cl.² .............................................. B62D 55/30
[52] U.S. Cl. ......................................... 305/30; 305/32
[58] Field of Search ...................... 305/32, 31, 10, 22, 305/29; 74/242.15 R, 242.15 B, 242.16

[56] References Cited

U.S. PATENT DOCUMENTS

| | | | |
|---|---|---|---|
| 2,789,438 | 4/1957 | Hutchinson | 305/32 UX |
| 2,846,276 | 8/1958 | Hendrickson | 305/32 |

FOREIGN PATENT DOCUMENTS 581912  8/1959  Canada ...................................... 305/32

Primary Examiner—David A. Scherbel
Attorney, Agent, or Firm—Lerner, David, Littenberg & Samuel

[57] ABSTRACT

Track tensioning apparatus for track-type vehicles having a track, a track frame and an idler wheel engageable with the track. The track tensioning apparatus comprises a bearing rotatably mounting the idler wheel so as to rotate about an idler wheel axis and a support for supporting the bearing to selectively pivot about a support axis parallel to and spaced from the idler wheel axis. A locking device is provided for adjustably locking the bearing with the support so that the idler wheel axis is in a predetermined angular position with respect to the support axis. In a preferred embodiment, the locking device is continuously adjustable to infinitely vary the predetermined angular position. Other locking devices are also disclosed, as well as a method for adjusting the tension of the track.

11 Claims, 5 Drawing Figures

TOOTHINGS FOR STEPWISE LOCKING WITH 24'

TRACK TENSIONING APPARATUS AND METHOD FOR TRACK-TYPE VEHICLES

BACKGROUND OF THE INVENTION

The Present Invention relates to apparatus for tensioning tracks of track-type vehicles, for example armored combat vehicles, in which the deflection or idler wheel of the track rotatably mounted on a bearing pin is pivotal in such a manner that the length of the track run is increased or decreased.

In prior art track tensioning apparatus, known for example from DT-OS 16 30 118 and 19 52 939, French Pat. No. 1,514,404 and U.S. Pat. Nos. 2,561,901 and 3,332,725, the bearing pin carrying the deflection wheel is rigidly mounted to a rocker which in turn is mounted in the chassis by means of a bearing journal not in alignment with the bearing pin. The track tension is obtained by the rocker being held in a corresponding pivot position under the force of a spring or a hydraulically produced force.

The Prior art apparatus which maintains this pivot position, possibly with a certain spring resilience, are of a complicated construction and bulky. In the case of combat vehicles they are also exposed to enemy fire and can thus be the cause of trouble in that the loss of track tension makes driving or at least adjustment of the track tension impossible.

The present invention is directed to an apparatus which overcomes such disadvantages and which further reduces the construction expenditure and space requirements for track tensioning means. According to one aspect of the present invention there is provided apparatus for tensioning tracks of track-type vehicles for example armored combat vehicles, in which the deflection or idler wheel of the track rotatably mounted on a bearing pin is pivotal in such a manner that the length of the track run is increased or decreased, wherein the bearing pin is pivotal with respect to its support element about an axis of rotation disposed parallel adjacent the axis of rotation of the deflection wheel but still within the bearing pin and wherein means are provided for locking the bearing pin with respect to its support element in given angular positions.

By mounting the bearing pin eccentrically with respect to its support and making the extent of the eccentricity adjustable, the means for tensioning the track can be arranged at a location protected from enemy fire between the deflection wheel and the chassis; thus, no means are required laterally of the deflection wheel.

In the preferred form of the invention the support element is a support journal which is mounted within the bearing pin and projects into the latter substantially up to the level of the deflection wheel.

The track is tensioned by pivoting or rotating the bearing pin around the support journal whereby the path of the track is increased or decreased.

The bearing pin may have large dimensions to obtain the desired eccentricity and to take up considerable forces.

According to another aspect of the invention there is provided apparatus for tensioning tracks of track-type vehicles, for example armored combat vehicles, in which the deflection wheel of the track rotatably mounted on a bearing pin is pivotal in such a manner that the length of the track run increases or decreases, and the deflection wheel is mounted on a rocker pivotably mounted in a rocker bearing on the chassis of the track-type vehicle in such a manner that the connecting line between the rocker bearing and the axis of rotation of the deflection wheel coincides substantially with the resultant of the directions of the two chain runs converging towards the deflection wheel, the rocker bearing lying between the axis of rotation of the deflection wheel and the portion of the track bearing on the deflection wheel. Preferably at the end of the rocker opposite the rocker bearing a support journal is secured. Further the bearing pin preferably comprises a bore extending eccentrically to the axis of rotation of the deflection wheel and parallel thereto for receiving the support journal and means are provided for securing and locking the bearing pin with respect to the support journal in predetermined angular positions of the bearing pin.

The fixing of the angular position of the bearing pin with respect to the support element may be made in infinitely variable manner or in steps, with large track forces the stepwise fixing is to be preferred because it operates in form-locking manner and not in a non-positive manner like the previously mentioned fixing.

The arrangement of the support journal on a rocker permits a certain pivoting of the deflection or idler wheel and thus avoids a rigid mounting thereof which is disadvantageous when there is a danger of the deflection wheels coming against the ground in uneven terrain.

The adjustment of the bearing pin with respect to its support element, i.e. the adjustment of the eccentricity and thus the track tension, is preferably effected by means of a tensioning key which engages a plurality of lateral faces, or one or more recesses at the second end face of the bearing pin in a positive manner. The free end of the tensioning key may be brought in to engagement with the track so that it is possible to perform this adjustment by slowly driving the vehicle forwards or backwards, i.e. without any additional auxiliary means and in particular without any human effort.

Further, details and advantages of the invention will become apparent from the following detailed description taken in conjunction with the accompanying drawings.

BRIEF DESCRIPTION OF THE DRAWINGS

These drawings show examples of some embodiments of the invention wherein.

DETAILED DESCRIPTION OF THE PREFERRED EMBODIMENTS

Figure 1:
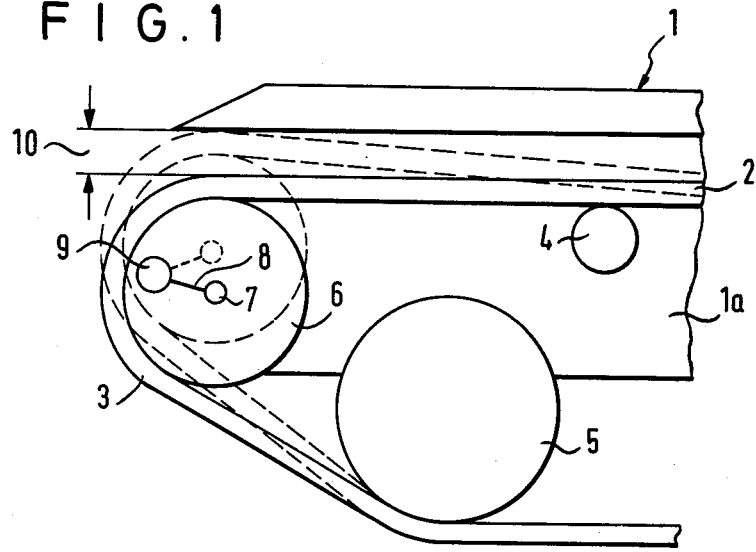
FIG. 1 is a side view of the front part of a combat vehicle with the track and the idler or deflection wheel, FIG. 2. is a horizontal section throught the deflection wheel according to FIG. 1.

FIG. 1 shows the left front portion of a combat vehicle 1 whose track runs 2 and 3 are guided on support rollers 4 and on track rollers 5 and reversed by means of a deflection or idler wheel 6. As shown simplified in FIG. 1 the deflection wheel 6 is mounted on a bearing pin 7 which is mounted in the chassis 1a of the combat vehicle 1 via rocker 8 and rocker bearing 9.

The rocker 8 lies substantially along the resultant of the forces of the two chain runs 2 and 3 converging towards the wheel 6, the rocker bearing 9 being disposed between the bearing pin 7 and the portion of the track runs 2 and 3 resting on the wheel 6. Thus, on contact with the ground the wheel 6 can yield and take up shock. The maximum ride clearance is denoted by 10.

Figure 2:
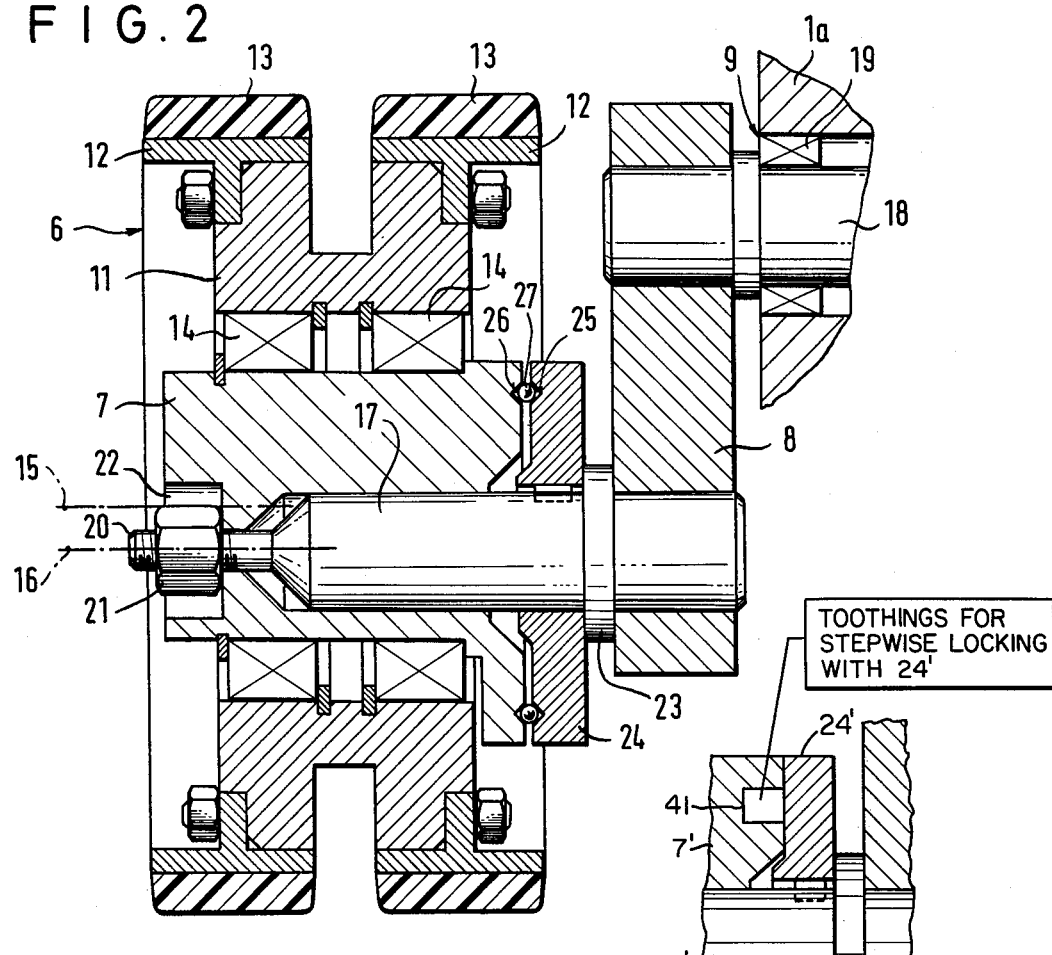

FIG. 2 shows details of the deflection or idler wheel 6, its arrangement and the rocker 8. The wheel 6 comprises a hub 11, two track cushion carriers 12 screwed thereto and track cushions 13. The wheel hub 11 is mounted by means of antifriction bearings 14 on the cylindrical bearing pin 7, giving the axis of rotation 15. The bearing pin 7 comprises a stepped but continuous bore in an eccentric axis 16 arranged parallel adjacent the axis of rotation 15. In said bore there is a support journal 17 whose rear end is fixedly mounted in a bore of the rocker 8 (such as for example by shrink fitting). The latter is mounted via a rocker journal 18 fixed in a further bore by means of antifriction bearings 19 for rotation in the chassis (rocker bearing 9).

The support journal 17 thus carries the deflection wheel 6 via the bearing pin 7. It terminates at the front end in a threaded section 20 on which a nut 21 is mounted which is supported on the end face of a circular recess 22 of the bearing pin 7 and on tightening by means of a spanner tends to move the support journal 17 towards the left. However, a limit is set on this motion by a thrust disc 24 keyed to the support journal 17 and bearing on a collar 23 of said journal 17. Balls 27 are thereby pressed into blind holes 25 and 26, disposed in the edge region of the thrust disc 24 and of the bearing pin 7. These holes form together with the balls 27 a detent means connecting the bearing pin 7 as regards rotational movement in a positive manner to the thrust disc 24 and thus also to the support journal 17, providing the nut 21 is tightened. If the latter is slackened, the bearing journal 7 and the thrust disc 24 can be moved with respect to each other. This changes the position of the eccentricity of the deflection wheel with respect to the support journal 17 and this lengthens or shortens the length of the track around the deflection wheel 6 and thus changes the track tension.

The support jounal 17, rocker 8, rocker journal 18 and thrust disc 24 may be made integral with one another in an advantageous manner.

Figure 3:
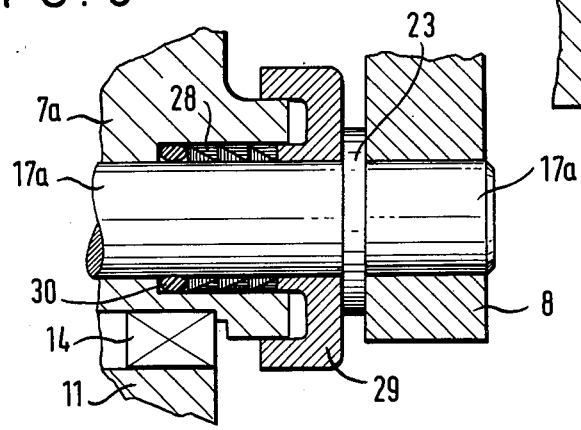
FIG. 3 is a modification of the locking means for the deflection wheel in partial section

The form-locking connection between the bearing pin 7 and the suppor journal 17 according to the FIG. 2 is replaced in the embodiment according to FIG. 3 by a nonpositive connection in the form of ring spring clamping elements 28. The latter are accommodated in a recess of the bearing pin 7a and are displaced (by a disc 29 against a thrust ring 30 disposed at the end of the recess) radially outwardly against the bearing pin 7a and radially inwardly against the support journal 17a so that connection is established between these two parts. The force for this purpose is applied to the disc 29 by the support journal 17a via the collar 23, the support journal 17a being moved by means of a screw connection as according to FIG. 2. The other parts illustrated in FIG. 3, i.e. the wheel hub 11, the antifriction bearing 14 and the rocker 8, correspond to those according to FIG. 2.

Figure 3A:
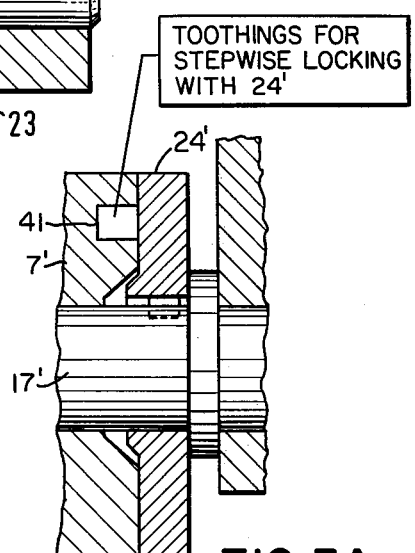
FIG. 3A is a still further modification of the locking means for the deflection wheel in partial section.

FIG. 3a shows a still further modification for the locking means. In this alternative embodiment, which is similar to that shown in FIG. 2, the blind holes 25 and 26 as well as balls 27 have been replaced by toothings, as at 41, on the end surface of the bearing pin 7' and of a thrust disc 24' fixedly connected to the support journal 17' so that a positive stepwise locking of the bearing pin 7' with respect to the support journal 17' is possible in predetermined angular positions.

Figure 4:
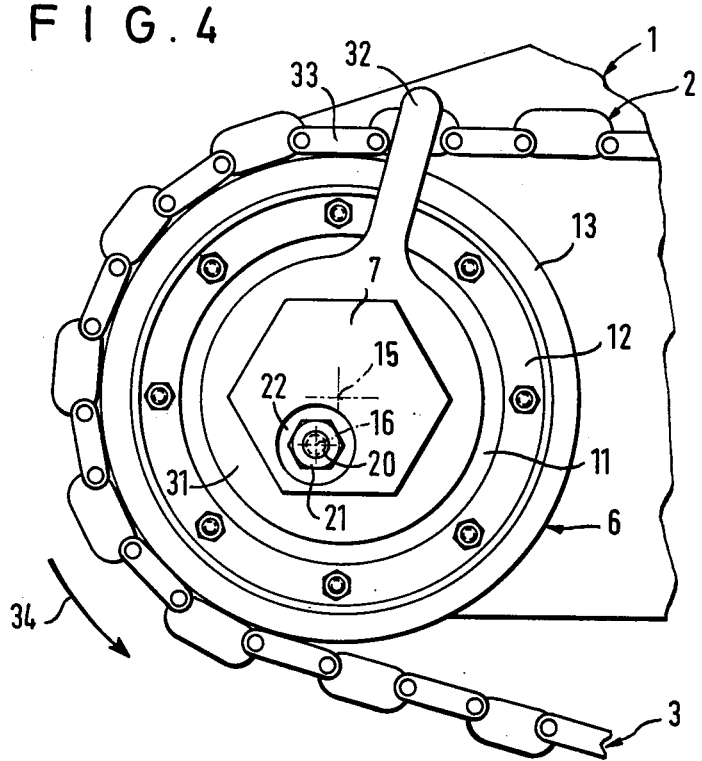
FIG. 4 is a side view of the deflection wheel with the track tensioning key in place.

FIG. 4 is a side view of the wheel 6 according to FIG. 2 with the hub 11, the track cushion carrier 12 and the track cushion 13. It is apparent that the free end face of the bearing pin 7 with the recess 22 for the threaded section 20 and for the nut 21 is made hexagonal in the radially outer region so that a tensioning key 31 may be used. The grip portion 32 thereof extends radially outwardly and is wide enough for it to engage into the intermediate space between two adjacent track connectors 33 of the track ⅜.

The track tensioning operation is carried out with the nut 21 slackened accoding to FIG. 2 with the aid of the tensioning key 31, whose grip portion 32 engages into the track ⅜, in that the track ⅜ is moved in the direction of the arrow 34, i.e. the combat vehicle 1 is driven forwards a small amount. The axis of rotation 15 of the wheel 6 is thereby led anticlockwise round the eccentric axis 16 of the support journal, which is equivalent to displacing the wheel 6 to the left and thus tensioning the track ⅜. Once the desired track tension has been reached the combat vehicle 1 is stopped; the nut 21 (cf. FIG. 2) is then tightened.

To reduce the track tension the corresponding procedure is adopted but the combat vehicle is driven backwards.

I claim:

1. Track tensioning apparatus for track type vehicles having a track, a track frame, and an idler wheel engageable with said track, said track tensioning apparatus comprising:

bearing means rotatably mounting said idler wheel to rotate about an idler wheel axis, said bearing means comprising a bearing pin having an eccentric bore whose axis is spaced from and parallel to said idler wheel axis;

support means including a support journal received by said eccentric bore of said bearing pin for supporting said bearing pin to selectively pivot about the axis of said support journal; and adjustable lock means for adjustably locking said bearing pin with said support journal so that said idler wheel axis is in a predetermined angular position with respect to the axis of said support journal.

2. The track tensioning apparatus of claim 1 wherein said adjustable lock means comprises stepwise locking means for providing positive stepwise locking of said bearing pin and support journal to stepwise vary said predetermined angular position.

3. The track tensioning apparatus of claim 2 wherein said bearing pin and said support means include opposed end surfaces facing one another, and wherein said stepwise locking means comprises blind holes, detent balls for said blind holes, and means for holding said end surfaces of said bearing pin and said support means together to maintain said detent balls in said blind holes to lock said bearing pin in a predetermined position relative to said support journal.

4. The track tensioning apparatus of claim 3 wherein said bearing pin and said support means include opposed end surfaces facing one another, and wherein said stepwise locking means comprises end face toothings on said bearing pin for providing positive stepwise locking between said bearing pin and said support means.

5. Track tensioning apparatus for track type vehicles having a track, a track frame, and an idler wheel engageable with said track, said track tensioning apparatus comprising bearing means rotatably mounting said idler wheel to rotate about an idler wheel axis; support means for supporting said bearing means to selectively pivot about a support axis parallel to and spaced from said idler wheel axis, said bearing means and said support means including opposed end surfaces facing one another; and adjustable lock means for adjustably locking said bearing means with said support means so that said idler wheel axis is in a predetermined angular position with respect to said support axis, said lock means comprising blind holes, and means for holding said end surfaces of said bearing means and said support means together to maintain said detent balls in said blind holes to lock said bearing means in a predetermined position relative to said support means.

6. The track tensioning apparatus according to claims 1, 5, 2, 3 or 4 wherein said bearing means includes means for form-lock fitting of one end of an elongated tool which, with its other end, is engageable positively with the track.

7. The track tensioning apparatus of claim 6 wherein said means for form-lock fitting comprises a plurality of lateral faces on said bearing means for engaging corresponding lateral faces on said one end of said elongated tool.

8. The track tensioning apparatus according to claims 1, 5, 2, 3 or 4 wherein said support means comprises a rocker arm carrying said support journal at one end thereof, and pivot mounting means for pivotally mounting the other end of said rocker arm to a track fram to freely pivot about a pivot axis spaced from and parallel to both said idler wheel axis and the axis of said support journal.

9. The track tensioning apparatus according to claim 8 wherein said bearing means includes means for form-lock fitting of one end of an elongated tool which, with its other end, is engaged positively with the track.

10. The track tensioning apparatus of claim 8 wherein said means for form-lock fitting comprises a plurality of lateral faces of said bearing means for engaging corresponding lateral phases on said one end of said elongated tool.

11. The track tensioning apparatus of claim 8 wherein said pivot axis and said idler wheel axis lie along a line which coincides with the resultant of the directions of the two runs of the track converging towards said idler wheel, said pivot axis being disposed between said idler wheel axis and that portion of the track looped around said idler wheel.

* * * * *